(12) United States Patent
Coldwell

(10) Patent No.: US 8,806,338 B2
(45) Date of Patent: Aug. 12, 2014

(54) SYSTEM AND METHOD FOR INTERACTIVE INTERNET PROTOCOL TELEVISION HELP

(75) Inventor: Robert Coldwell, San Antonio, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 450 days.

(21) Appl. No.: 12/622,890

(22) Filed: Nov. 20, 2009

(65) Prior Publication Data

US 2011/0126101 A1   May 26, 2011

(51) Int. Cl.
*G06F 3/048* (2013.01)

(52) U.S. Cl.
USPC ............ 715/710; 715/705; 715/707; 715/709

(58) Field of Classification Search
USPC .......................................... 715/705–709, 710
See application file for complete search history.

(56) References Cited

U.S. PATENT DOCUMENTS

| | | | |
|---|---|---|---|
| 6,151,059 A | 11/2000 | Schein et al. | |
| 6,412,110 B1 | 6/2002 | Schein et al. | |
| 6,594,466 B1 * | 7/2003 | Harned et al. | 434/350 |
| 7,062,777 B2 | 6/2006 | Alba et al. | |
| 7,137,135 B2 | 11/2006 | Schein et al. | |
| 2006/0242666 A1 | 10/2006 | Alba et al. | |
| 2008/0184295 A1 | 7/2008 | Alba et al. | |
| 2008/0229362 A1 | 9/2008 | White et al. | |
| 2009/0063969 A1 * | 3/2009 | White | 715/705 |
| 2010/0138515 A1 * | 6/2010 | Ruiz-Velasco et al. | 709/217 |
| 2010/0180292 A1 * | 7/2010 | Epstein et al. | 725/32 |
| 2010/0201879 A1 * | 8/2010 | VanDuyn et al. | 348/565 |

* cited by examiner

*Primary Examiner* — Amy Ng
*Assistant Examiner* — Claudia Dragoescu
(74) *Attorney, Agent, or Firm* — Guntin & Gust, PLC; Joseph P. Hrutka

(57) ABSTRACT

A set-top box device includes an interactive help module configured to receive a request for a list of interactive help applications for a service in an Internet Protocol television network, retrieve a first interactive help application from a server in the Internet Protocol television network, and output first text associated with a first step in the first interactive help application to a display. The interactive help module is also configured to receive a first input for the first step, compare the first input with a first correct input, output second text associated with a second step to the display if the first input matches the first correct input, and otherwise output to the display third text associated with a wrong input received and the first text associated with the first step.

20 Claims, 6 Drawing Sheets

SYSTEM AND METHOD FOR INTERACTIVE INTERNET PROTOCOL TELEVISION HELP

FIELD OF THE DISCLOSURE

The present disclosure generally relates to communications networks, and more particularly relates to a system and a method for interactive Internet Protocol television help.

BACKGROUND

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
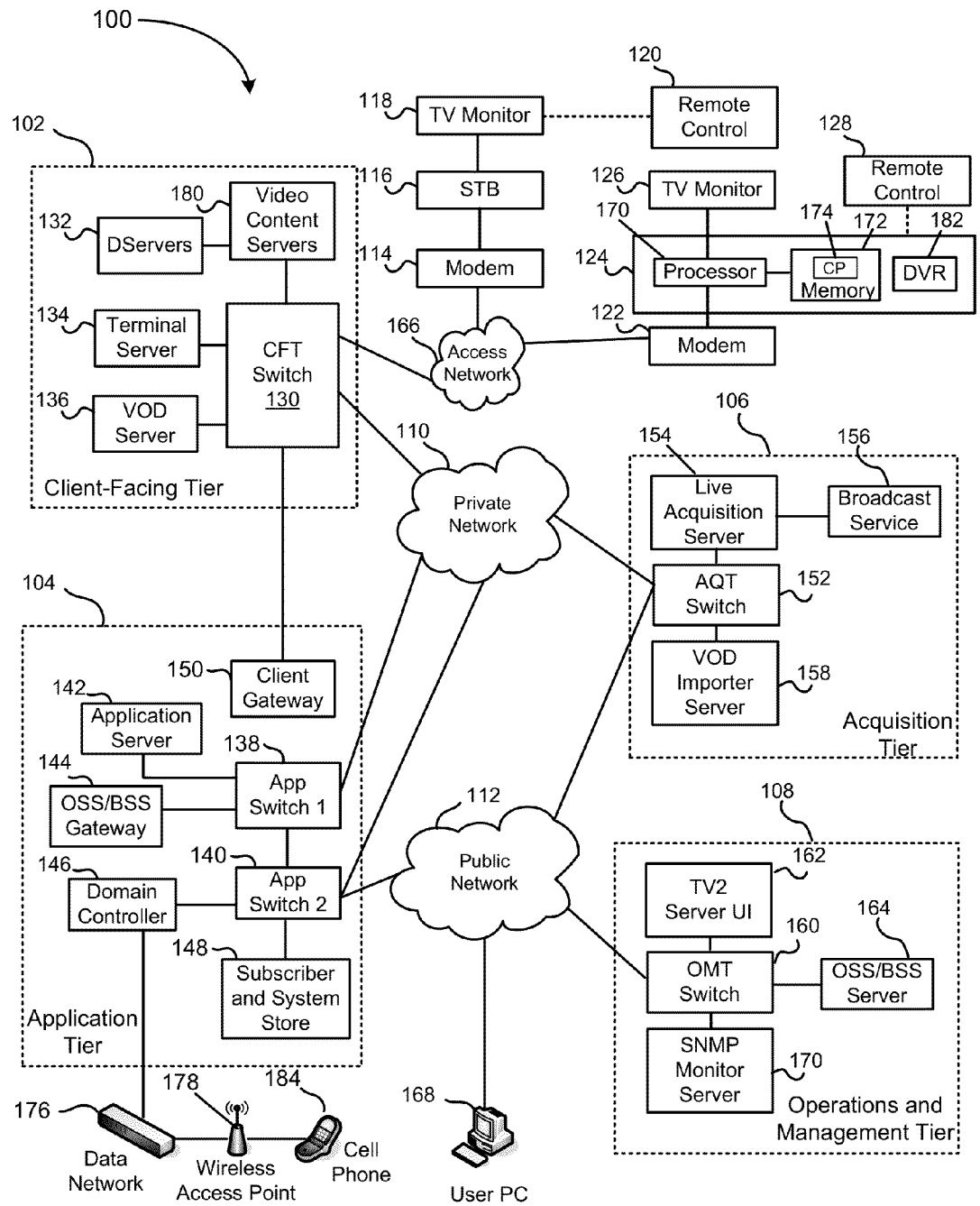
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-ondemand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
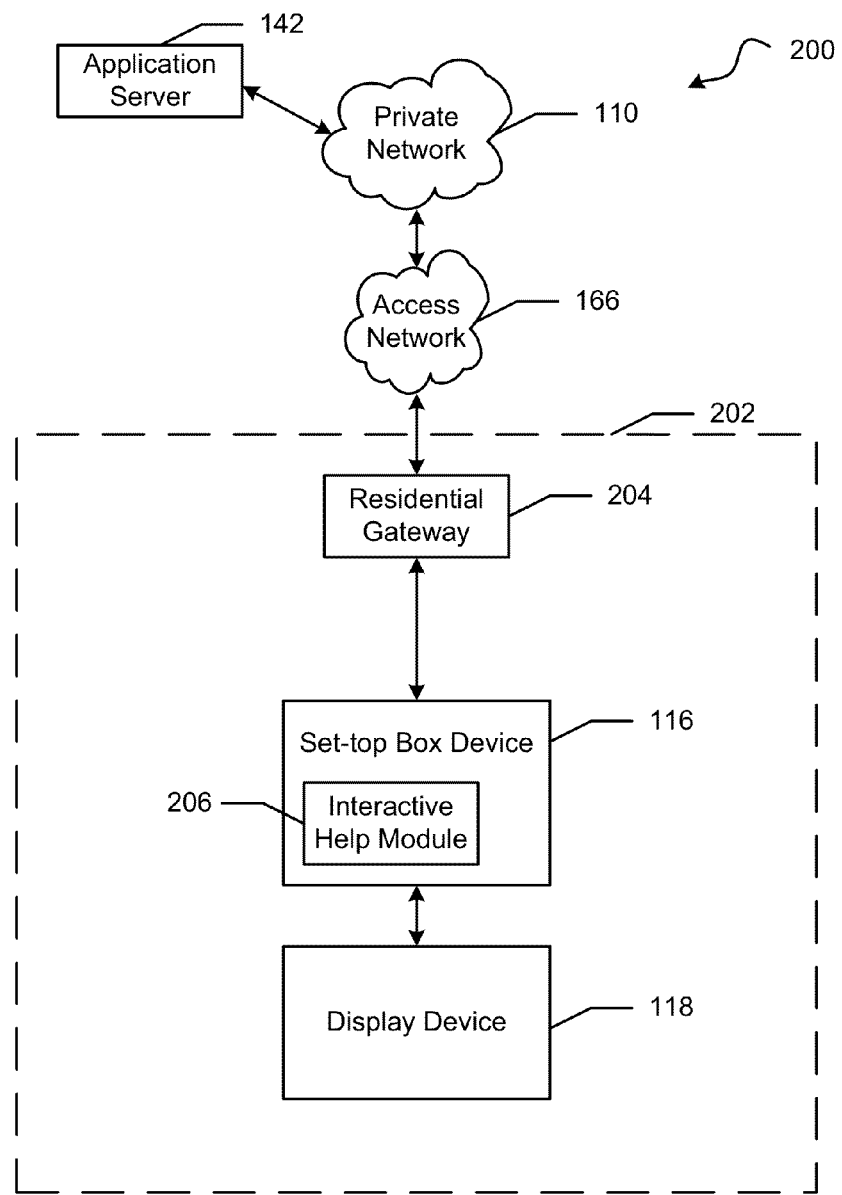
FIG. 2 is a block diagram of a portion of the IPTV system.

FIG. 2 shows a portion 200 of the IPTV system including the private network 110, the application server 142, the access network 166, and a customer premises 202 that in turn includes a residential gateway 204, the set-top box device 116, and the display device 118. The set-top box device 116 includes an interactive help module 206. The residential gateway 204 is in communication with the set-top box device 116, and with the application server 142 via the access network 166 and the private network 110. The interactive help module 206 of the set-top box device 116 is in communication with the residential gateway 204 and the display device 118. The interactive help module 206 can be hardware, software, or any combination of hardware and software.

The set-top box device 116 can receive video streams for television programs from the IPTV system 100 via the private network 110 and the access network 166. A user can cause the set-top box device 116 to perform different functions, such as set television programs to be recorded, play back recorded television programs, and view video-on-demand programs. The user can also set reminders for television programs, such that the set-top box device 116 can output a notification to the display device 118 that a specific television program is about to be provided to the set-top box device 116 for display. However, the user may have difficulty performing one or more of these functions of the set-top box device 116.

Figure 3:
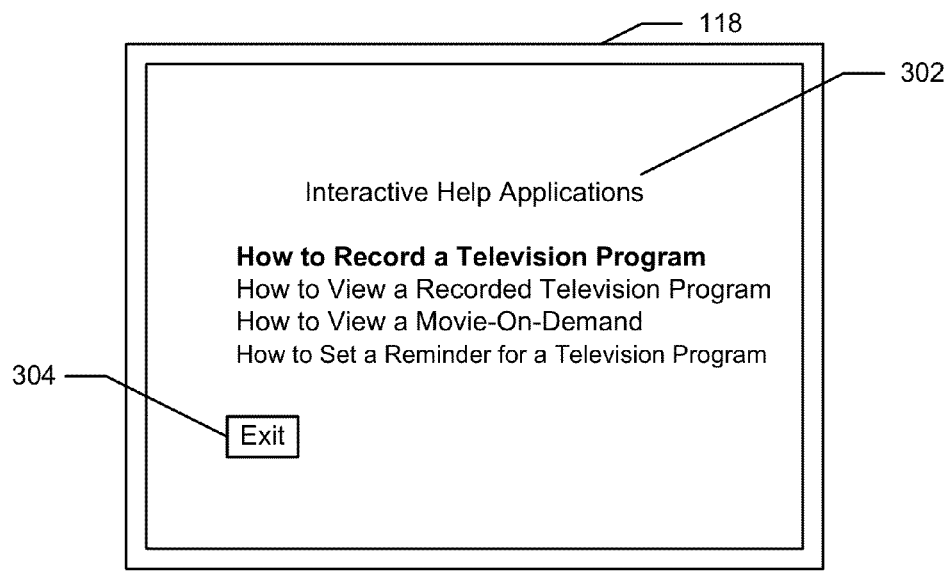
FIGS. 3-6 are exemplary screen shots of an interactive help application.

The IPTV system 100 and the set-top box device 116 can provide the user with multiple interactive help applications associated with different functions of the set-top box device. The user can utilize the interactive help module 206 to access an interactive help application and to follow along with actions of a tutorial for one of the functions of the set-top box device 116. The user can access the interactive help module 206 by selecting a specific channel on the set-top box device 116, by pressing a specific button on the remote control device 120, or the like. The interactive help module 206 can connect to the application server via the residential gateway 204, the access network 166, and the private network 110 to retrieve a list of interactive help applications 302 available to the user. When the interactive help module 206 has retrieved the list of interactive help applications 302, the interactive help module can output the list to the display device 118 as shown in FIG. 3.

If the user does not want to run one of the interactive help applications in the list of interactive help applications 302, the user can select an exit button 304 and the interactive help module can disconnect from the application server 142. Otherwise, the user can highlight and select one of the interactive help applications as shown in FIG. 3, and the interactive help module 206 can retrieve the selected interactive help application from the application server 142. The interactive help module 206 can then store the selected interactive help application on the set-top box device 116 so that the interactive help module can execute the interactive help application without having to be in continuous communication the application server 142. However in another embodiment, the interactive help module 206 can run the selected interactive help application directly from the application server 142 without downloading the entire selected interactive help application to the set-top box device 116. The interactive help application can include multiple instructions and steps for the user to follow and perform while learning one of the functions of the set-top box device 116. When the interactive help module 206 executes the interactive help application, the interactive help module can display the instructions for the steps of the tutorial on the display device 118 as shown in FIGS. 4-6.

Figure 4:
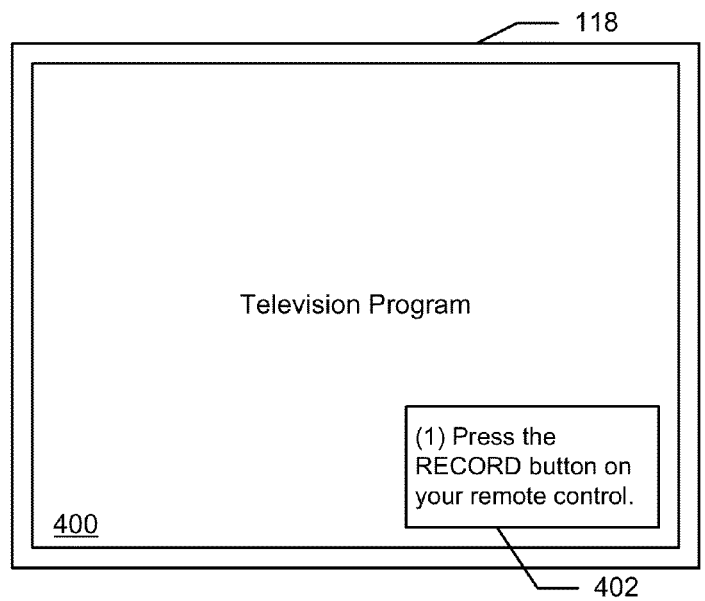
Figure 5:
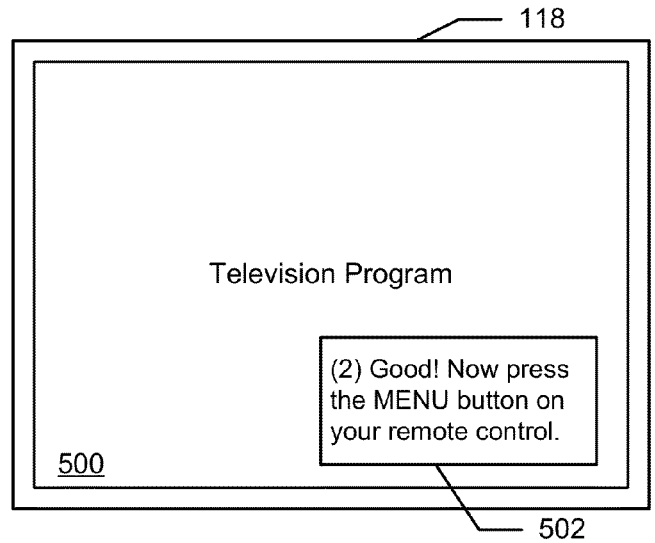
Figure 6:
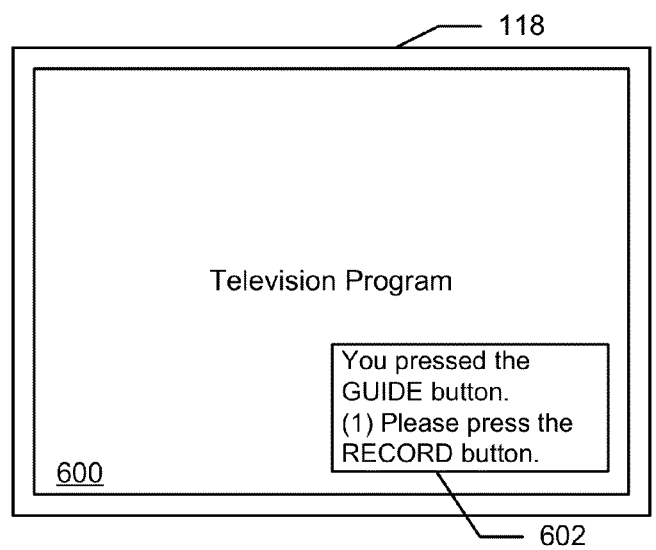

FIGS. 4-6 show respective exemplary screen shots 400, 500, and 600 of the interactive help application including a first text block 402, a second text block 502, and a third text block 602. The text blocks displayed on the display device 118 can depend on the function with which the interactive help application is associated, the previous input from the user, and the like. For example, if the user selects an interactive help application that is associated with recording a television program, the text blocks for the steps of the interactive help application can be different than if the user selects an interactive help application associated with downloading a movie-on-demand. When the selected interactive help application is associated with recording a television program, the interactive help module 206 can display a television program for the user to set to record and can output text associated with a first step in the in the process. For example, the interactive help module 206 can display the first text block 402 "(1) Press the RECORD button on your remote control" as shown in FIG. 4.

The interactive help module 206 can then wait for an input from the user, such as the user pressing a button on the remote control 120. When the input is received the interactive help module 206 can compare the input to a correct input for this step in the interactive help application. If the user input is correct, the interactive help module 206 can output a congratulatory statement and a second step in the interactive help application, such as the second text block 502 "Good! Now press the MENU button on your remote control" as shown in FIG. 5. However, if the user input in incorrect, the interactive help module 206 can notify the user that the input was incorrect. For example, the interactive help module 206 can output a statement indicating the actual input of the user, and can again output the first step in the interactive help application, such as the third text block 602 "You pressed the GUIDE button. (1) Please press the RECORD button" as shown in FIG. 6.

The interactive help module 206 can continue to output each of the steps in the interactive help application until the user has correctly executed each step in the interactive help application for the selected function of the set-top box device 116. When the interactive help application is completed, the interactive help module 206 can remove the interactive help application from the set-top box device 116, reconnect with the application server 142, retrieve the list of interactive help applications 302, and output the list on the display device 118 as shown in FIG. 3. If the user selects another one of the interactive help applications, the interactive help module 206 can download the selected interactive help application and execute the steps as stated above. However, if the user elects to end the interactive help session by selecting the exit button 304, the interactive help module 206 can disconnect from the application server 142 and the user can select a channel associated with a television program for viewing.

Figure 7:
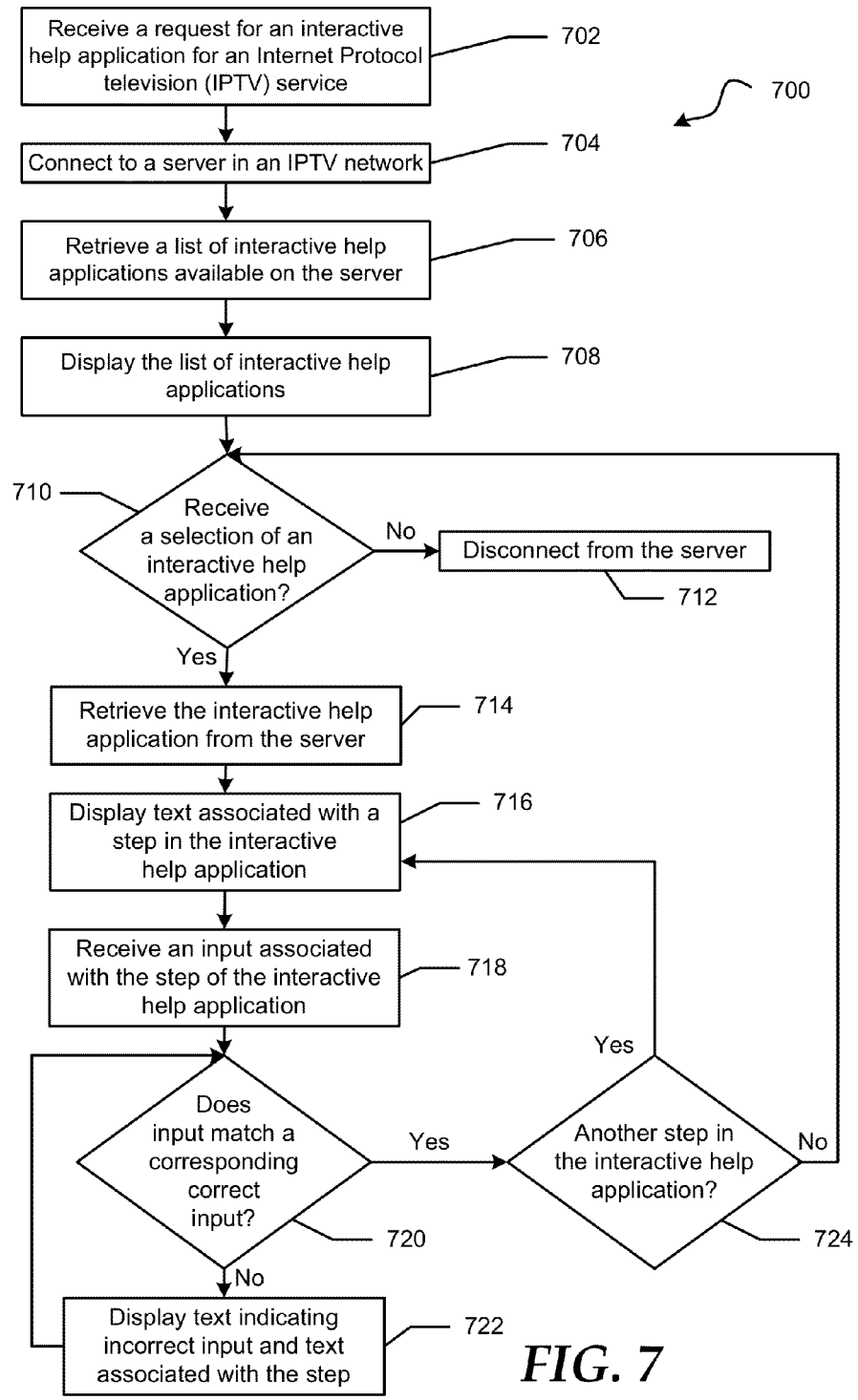
FIG. 7 is a flow diagram of a method for running the interactive help application on a set-top box device of the IPTV system.

FIG. 7 shows a flow diagram of a method 700 for running an interactive help application in the set-top box device 116. At block 702, a request for an interactive help application for an IPTV service is received. The interactive help application can be associated with setting television programs to be recorded, playing back recorded television programs, viewing a video-on-demand program, setting reminders for television programs, deleting a recorded television program, and the like. The set-top box device is connected to a server in an IPTV network at block 704. At block 706, a list of interactive help applications available on the server is retrieved. The list of interactive help applications is displayed at block 708. At block 710, a determination is made whether a selection of an interactive help application has been received.

If the selection of the interactive help application is not received, the set-top box device is disconnected from the server at block 712. If the selection of the interactive help application is received, the interactive help application is retrieve from the server at block 714. At block 716, text associated with a step in the interactive help application is displayed. An input associated with the step of the interactive help application is received at block 718. The input can be a signal from a remote control corresponding to a specific button on the remote control being pressed.

At block 720, a determination is made whether the input matches a corresponding correct input for the step of the interactive help application. If the input does not match the correct input, text indicating that the input is incorrect and the text associated with the step of the interactive help application is displayed at block 722 and the flow diagram continues as stated above at block 720. If the input does match the correct input, a determination is made whether there is another step in the interactive help application at block 724. If there is another step in the interactive help application, the flow diagram continues as stated above at block 716. If there is not another step in the interactive help application, the flow diagram continues as stated above at block 710.

Figure 8:
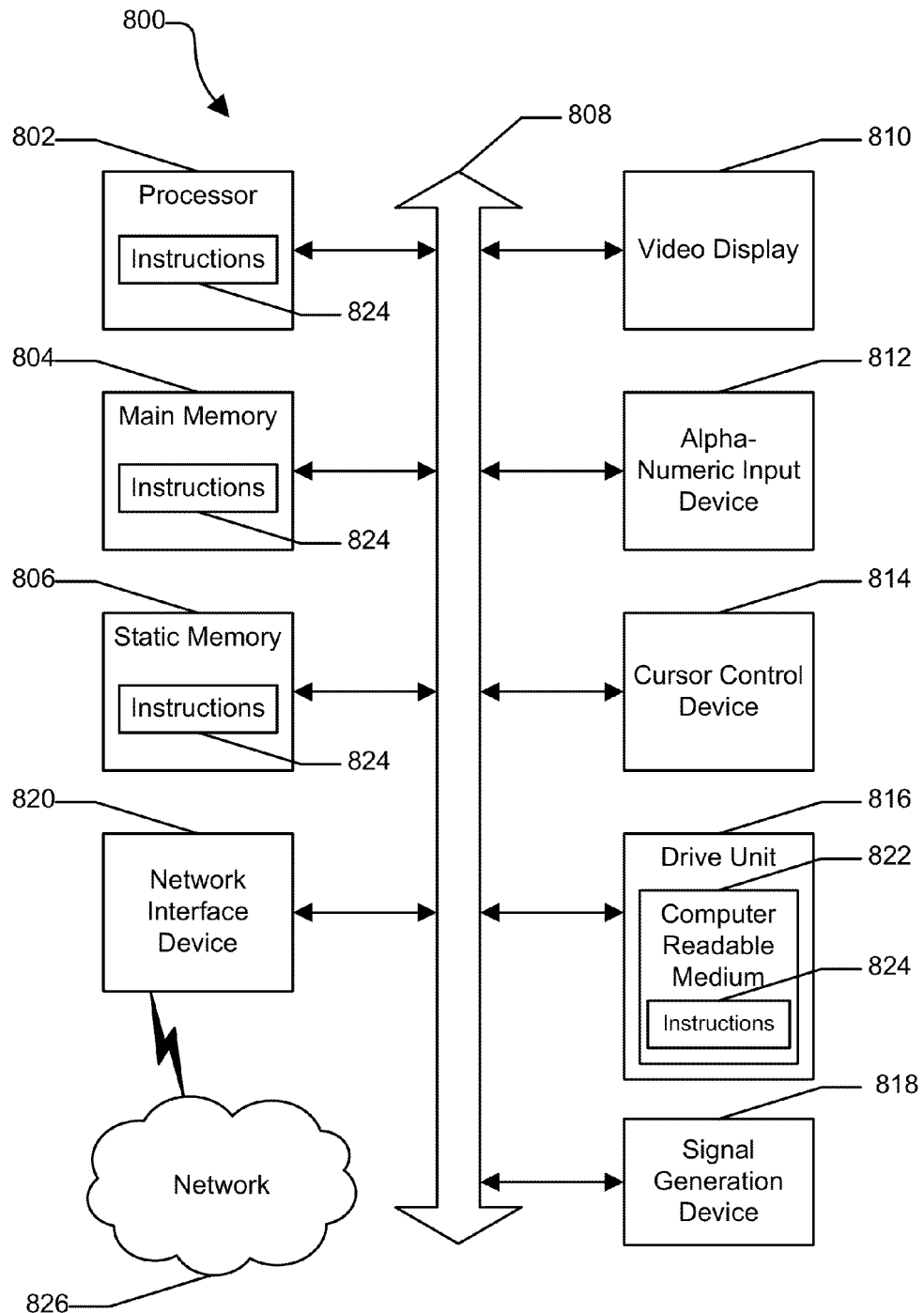
FIG. 8 is an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid state display, or a cathode ray tube (CRT). Additionally, the computer system 800 may include an input device 812 such as a keyboard, and a cursor control device 814 such as a mouse. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
   accessing, by a set-top box, an interactive help service by tuning to a specific media channel of an interactive television network responsive to receiving user input requesting the specific media channel;
   receiving, by the set-top box, a request for a list of interactive help applications of the interactive help service through the specific media channel;
   retrieving, by the set-top box, the list of interactive help applications from a server via the interactive television network;
   outputting, by the set-top box, the list of interactive help applications to a display;
   receiving, by the set-top box, a selection of a first interactive help application within the list of interactive help applications, wherein the first interactive help application is associated with operation of a selected function of the set-top box;
   retrieving, by the set-top box, the first interactive help application from the server;
   storing, by the set-top box, the first interactive help application in response to receiving the selection of the first interactive help application, resulting in a stored copy of the first interactive help application, wherein the first interactive help application is run locally using the stored copy of the first interactive help application, without the set-top box having to be in continuous communication with the server via the interactive television network;
   outputting, by the set-top box, to the display a first text associated with a first step in the first interactive help application and a multimedia program concurrently, wherein the multimedia program is unrelated to the first interactive help application, and wherein the first step relates to a first step in operating the selected function of the set-top box with respect to the multimedia program;
   receiving, by the set-top box, a first input for the first step;
   comparing, by the set-top box, the first input with a first correct input;
   outputting, by the set-top box, to the display a second text affirming that the first input matches the first correct input, wherein the second text is associated with a second step in the first interactive help application if the first input matches the first correct input, otherwise outputting to the display a third text associated with a wrong input received and the first text associated with the first step, wherein outputting one of the second text or the third text to the display occurs concurrently with the multimedia program;
   determining, by the set-top box, that the first interactive help application is successfully completed, wherein the operating of the selected function of the set-top box is successfully completed upon successful completion of the first interactive help application;
   ending, by the set-top box, the first interactive help application; and
   removing, by the set-top box, the stored copy of the first interactive help application, responsive to determining that the first interactive help application is completed.

2. The method of claim 1 further comprising:
   receiving, by the set-top box, a selection of a second interactive help application;
   retrieving, by the set-top box, the second interactive help application from the server;
   outputting, by the set-top box a fourth text associated with a third step in the second interactive help application to the display;
   receiving, by the set-top box, a second input for the third step;
   comparing, by the set-top box, the second input with a second correct input;
   outputting, by the set-top box, a fifth text associated with a fourth step to the display if the second input matches the second correct input, otherwise outputting to the display a sixth text associated with the wrong input received and the fourth text associated with the third step to the display;
   determining, by the set-top box, that the second interactive help application is completed; and
   ending the second interactive help application.

3. The method of claim 1 wherein the first text includes a description of a first action for the user to perform, and wherein the selected function comprises one of recording the multimedia program, playing back a recorded television program, or viewing a video on demand program.

4. The method of claim 1 wherein the first interactive help application is a tutorial for performing a function of the set-top box.

5. The method of claim 4 wherein the function is selected from a group comprising a record television program function, a play back recorded television program function, a television program reminder function, and a delete recorded television program function.

6. The method of claim 1 further comprising:
   connecting, by the set-top box, to the server via the interactive television network.

7. A method, comprising:
   accessing, by a set-top box, an interactive help service by tuning to a specific media channel of an interactive television network responsive to receiving a user input requesting the specific media channel;
   receiving, by the set-top box, a request for a list of interactive help applications of the interactive help service through the specific media channel;
   retrieving, by the set-top box, a first interactive help application from a server, wherein the first interactive help application is associated with operation of a selected function of the set-top box;
   storing, by the set-top box, the first interactive help application, resulting in a stored copy of the first interactive help application, wherein the first interactive help application is run locally using the stored copy of the first interactive help application, without the set-top box having to be in continuous communication with the server via the interactive television network;

outputting, by the set-top box, to a display a first text associated with a first step in the first interactive help application and a multimedia program concurrently, wherein the multimedia program is unrelated to the first interactive help application, and wherein the first step relates to a first step in operating the selected function of the set-top box with respect to the multimedia program;

receiving, by the set-top box, a first input for the first step;

comparing, by the set-top box, the first input with a first correct input;

outputting, by the set-top box, to the display a second text affirming that the first input matches the first correct input, wherein the second text is associated with a second step in the first interactive help application if the first input matches the first correct input, otherwise outputting to the display a third text associated with a wrong input received and the first text associated with the first step, wherein outputting one of the second text or the third text to the display occurs concurrently with the multimedia program;

determining, by the set-top box, that the first interactive help application is successfully completed, wherein the operating of the selected function of the set-top box is successfully completed upon successful completion of the first interactive help application;

ending, by the set-top box, the first interactive help application; and removing, by the set-top box, the stored copy of the first interactive help application, responsive to determining that the first interactive help application is completed.

8. The method of claim 7 further comprising:

receiving, by the set-top box, a selection of the first interactive help application within the list of interactive help applications, wherein the selected function comprises one of recording the multimedia program, playing back a recorded television program, or viewing a video on demand program.

9. The method of claim 7 further comprising:

retrieving, by the set-top box, the list of interactive help applications from the server via the interactive television network; and outputting, by the set-top box, the list of interactive help applications to the display.

10. The method of claim 7 further comprising:

receiving, by the set-top box, a selection of a second interactive help application;

retrieving, by the set-top box, the second interactive help application from the server;

outputting, by the set-top box, a fourth text associated with a third step in the second interactive help application to the display;

receiving, by the set-top box, a second input for the third step;

comparing, by the set-top box, the second input with a second correct input;

outputting, by the set-top box, a fifth text associated with a fourth step to the display if the second input matches the second correct input, otherwise outputting to the display a sixth text associated with the wrong input received and the fourth text associated with the third step;

determining, by the set-top box, that the second interactive help application is completed; and ending, by the set-top box, the second interactive help application.

11. The method of claim 7 wherein the first text includes a description of a first action to be performed by a user.

12. The method of claim 7 wherein the first interactive help application is a tutorial for performing a function of the set-top box.

13. The method of claim 12 wherein the function is selected from a group comprising one of a record television program function, a play back recorded television program function, a television program reminder function, and a delete recorded television program function.

14. A set-top box device, comprising:

a memory to store executable instructions; and a processor coupled to the memory, wherein execution of the instructions causes the processor to perform operations comprising:

accessing, by a set-top box, an interactive help service by tuning to a specific media channel of an interactive television network responsive to receiving an input selection requesting the specific media channel;

receiving a request for a list of interactive help applications of the interactive help service through the specific media channel;

retrieving a first interactive help application from a server via the interactive television network, wherein the first interactive help application is associated with operation of a selected function of the set-top box;

storing the first interactive help application in the memory resulting in a stored copy of the first interactive help application, wherein the first interactive help application is run locally using the stored copy of the first interactive help application, without the set-top box having to be in continuous communication with the server via the interactive television network;

outputting to a display a first text associated with a first step in the first interactive help application and a multimedia program concurrently, wherein the multimedia program is unrelated to the first interactive help application, and wherein the first step relates to a first step in operating the selected function of the set-top box with respect to the multimedia program;

receiving a first input for the first step;

comparing the first input with a first correct input; and outputting to the display a second text affirming that the first input matches the first correct input, wherein the second text is associated with a second step in the first interactive help application if the first input matches the first correct input, otherwise outputting to the display a third text associated with a wrong input received and the first text associated with the first step, wherein outputting one of the second text or the third text to the display occurs concurrently with the multimedia program.

15. The set-top box device of claim 14 wherein execution of the instructions causes the processor to perform operations further comprises:

determining that the first interactive help application is completed, ending the first interactive help application, and disconnecting from the server, wherein the operating of the selected function of the set-top box is successfully completed upon successful completion of the first interactive help application; and removing, by the set-top box, the stored copy of the first interactive help application, responsive to determining that the first interactive help application is completed.

16. The set-top box device of claim 14 wherein execution of the instructions causes the processor to perform operations comprising receiving a selection of the first interactive help application within the list of interactive help applications, wherein the selected function comprises one of recording the multimedia program, playing back a recorded television program, or viewing a video on demand program.

17. The set-top box device of claim 14 wherein execution of the instructions causes the processor to perform operations comprising retrieving the list of interactive help applications from the server via the interactive television network, and outputting the list of interactive help applications to the display.

18. The set-top box device of claim 14 wherein the first text includes a description of a first action for a user to perform.

19. The set-top box device of claim 14 wherein the first interactive help application is a tutorial for performing a function of the set-top box device.

20. The set-top box device of claim 19 wherein the function is selected from a group comprising one of a record television program function, a play back recorded television program function, a television program reminder function, and a delete recorded television program function.

* * * * *